2,220,042

AMIDINE VANADATE

William H. Hill, Stamford, Conn., assignor to American Cyanamid Company, New York, N. Y., a corporation of Maine No Drawing. Application November 18, 1939, Serial No. 305,175

4 Claims. (Cl. 260—429)

This invention relates to amidine salts of vanadic acid.

I have found that certain amidine salts of vanadic acid can be formed, which salts have unusual properties of considerable commercial importance. The amidine vanadates of the present invention are in general soluble in organic solvents which is an advantage over most vanadium compounds and which widens their field of use. One field in which vanadium compounds have been used is as mordants in dyeing processes. Most mordants are not soluble in organic solvents and it is therefore an advantage that the amidine vanadates of this invention can not only be used as mordants for fixing dyes to textiles such as fabrics, but can also be used as mordants for fixing dyes to metals, cellulose products such as paper, and chemically prepared materials such as resins. Since these salts are soluble in many organic solvents they can be incorporated in motor fuels to improve the burning characteristics thereof.

These vanadium compounds have antiseptic, bactericidal and insecticidal properties and may be used either in aqueous solutions or in many organic solvents such as alcohol, glycerine, etc. These salts may be incorporated in paints, in which case they exhibit important siccative and antifouling properties. They are also useful in the production of inks, both those in which metallic salts such as iron gallates are used and also those in which various aniline dyes are used. Another important use for the salts of the present invention is as catalysts in various oxidation processes and particularly liquid phase oxidation reactions.

The amidines which I have found to form salts with vanadic acid are those amidine bases containing a guanyl radical. The compounds may therefore be represented by the following type formula:

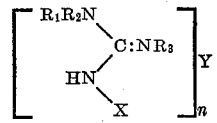

in which Y is the radical of a vanadic acid in which $n$ is a small whole number, and in which $R_1$, $R_2$ and $R_3$ are members of the group consisting of hydrogen, alkyl, hydroxy alkyl, and aryl radicals and X is a member of the group consisting of $R_1$, $O:NR_1R_2$, and $R_3N:CNR_1R_2$. The substituents $R_1$, $R_2$ and $R_3$ may be the same or different in various compounds included within the scope of the invention, and it should be understood that each symbol is intended to represent any member of the group defined.

While the exact compositions of the salts of the present invention have not been determined, it is believed that they are true addition products, that is to say, the vanadic acid group adds to the organic base to form a salt. These salts may be either the ortho, meta, or poly vanadic acid salts or mixtures thereof. The addition of the acid radical probably takes place at one of the nitrogen atoms of the amidine which undergoes a change of valance from 3 to 5. However, this fact has not yet been definitely established for any of the salts of organic nitrogen bases. Accordingly, the above formula represents the customary method of designating addition products of this nature, this method consisting simply of showing the formula of the base in juxtaposition to the formula of the acid.

An inspection of the above type formula will show that the amidine salts of my invention are salts of guanidine and derivatives containing the guanyl radical and substitution products such as guanyl urea, biguanid, and the alkyl, hydroxy-alkyl, and aryl substitution products of the above.

Any guanidine base may be used for this purpose such as guanidine itself, dimethyl or trimethyl guanidine, dibutyl guanidine, mono-, di- or triphenyl guanidine, ditolyl guanidine, or alkoxy substituted guanidines such as mono-, di- or tri-ethanol guanidine and the like. Similarly such guanyl urea compounds as guanyl urea itself, mono- or dimethyl guanyl urea, diphenyl guanyl urea, tetraethyl guanyl urea, and triethanol guanyl urea, are organic bases which will form salts of vanadic acid, either ortho, meta, or poly vanadic acids. Biguanid and such substituted biguanids as mono- and dimethyl and diethyl biguanids, diamyl biguanid, 1,5-diallyl biguanid, 1,1,5,5-tetramethyl biguanid, 1,1,2-trimethyl biguanid, and 1,2,3-triphenyl biguanid will also form salts of vanadic acid in accordance with the invention.

The invention will be illustrated in greater detail by the following specific examples. It should be understood, however, that although these examples describe certain compounds constituting specific embodiments of the invention, they are given primarily for purposes of illustration and the invention in its broader aspects is not limited thereto.

Example 1

A mixture of water, diphenyl guanidine, and a technical grade of 85% of vanadium pentoxide were heated together in a suitable container. The reaction occurred readily, the hot solution was filtered and a slightly yellow filtrate was obtained. Upon cooling a yellowish white material gradually settled out of the solution. The solution was filtered. The white-yellow solid, after drying, was boiled with alcohol and filtered. Most of the solid was dissolved by the alcohol to produce a yellow solution. The alcohol was evaporated and an intense yellow, soft resinous material was obtained. A portion of this material was placed on a hot plate whereupon quick decomposition resulted, leaving a porous black residue with a brownish green tinge which was vanadium oxide. A second portion of the solid material was treated with hot water and H₂S introduced whereupon a brown black precipitate was produced. In a parallel test on diphenyl guanidine there was no coloration produced upon the introduction of H₂S, thus clearly indicating that the bright yellow solid was a reaction product of diphenyl guanidine and vanadium pentoxide probably representing a mixture of the various diphenyl guanidine vanadates.

Example 2

A technical grade of vanadium pentoxide was added to an aqueous solution of guanidine carbonate. Violent frothing occurred and the vanadium pentoxide with the exception of impurities was completely dissolved. Vanadium pentoxide was added until the gas evolution became feeble. The solution was then heated to boiling and filtered. A clear yellow filtrate was obtained from which a heavy, fine, crystalline solid quickly came out. A portion of this solid heated on a hot plate left a residue of vanadium pentoxide. An aqueous solution tested with H₂S indicated that the compound was a vanadium salt of guanidine.

Example 3

A quantity of pure dicyandiamide was dissolved in water, a technical grade of vanadium pentoxide was added and the mixture boiled. The solution assumed a yellow color. Upon cooling a precipitate of guanyl urea vanadate was obtained.

While it is apparent by the above examples that amidines will react directly with $V_2O_5$ to form vanadates, the present invention is not limited to this particular process of producing the salts and the invention includes broadly the amidine salts of vanadic acids produced by any methods.

What I claim is:

1. As a chemical compound the reaction product of an amidine with vanadium pentoxide.
2. An amidine vanadate.
3. A guanidine vanadate.
4. A diphenyl guanidine vanadate.

WILLIAM H. HILL.